US009973998B2

United States Patent
Kotake et al.

(10) Patent No.: US 9,973,998 B2
(45) Date of Patent: May 15, 2018

(54) RELAY DEVICE AND AIR CONDITIONING SYSTEM

(71) Applicant: Mitsubishi Electric Corporation, Tokyo (JP)

(72) Inventors: Hiroaki Kotake, Tokyo (JP); Yoshiaki Koizumi, Tokyo (JP); Naoyuki Hibara, Tokyo (JP); Haruhiko Ishida, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days. days.

(21) Appl. No.: 15/118,946

(22) PCT Filed: Jun. 11, 2014

(86) PCT No.: PCT/JP2014/065453
§ 371 (c)(1),
(2) Date: Aug. 15, 2016

(87) PCT Pub. No.: WO2015/189932
PCT Pub. Date: Dec. 17, 2015

(65) Prior Publication Data
US 2016/0360467 A1    Dec. 8, 2016

(51) Int. Cl.
*H04B 7/00* (2006.01)
*H04W 40/22* (2009.01)
(Continued)

(52) U.S. Cl.
CPC ............ *H04W 40/22* (2013.01); *H04L 12/28* (2013.01); *H04L 12/66* (2013.01); *H04L 67/12* (2013.01); *H04L 69/08* (2013.01); *H04L 69/22* (2013.01)

(58) Field of Classification Search
CPC ......... H04L 12/28; H04L 69/22; H04L 69/08; H04L 67/12; H04L 12/66; H04W 40/22
(Continued)

(56) References Cited

U.S. PATENT DOCUMENTS

2006/0259784 A1    11/2006 Niwamoto et al.
2014/0051349 A1*    2/2014 Watanabe ............. H04W 40/12
                                                                 455/9

FOREIGN PATENT DOCUMENTS

EP       2 040 010 A1    3/2009
JP       2004-301430 A   10/2004
(Continued)

OTHER PUBLICATIONS

International Search Report of the International Searching Authority dated Sep. 9, 2014 for the corresponding International application No. PCT/JP2014/065453 (and English translation).
(Continued)

*Primary Examiner* — Eugene Yun
(74) *Attorney, Agent, or Firm* — Posz Law Group, PLC

(57) ABSTRACT

A relay device communicably connects an upper-level air conditioning system and a lower-level air conditioning system that use different protocols. An upper-side communicator is connected to a first bus, and transmits and receives communication packets to and from the upper-level air conditioning system. A lower-side communicator is connected to an outdoor device that is a master device, and transmits and receives communication commands to and from the lower-level air conditioning system. An association information memory stores association information obtained by associating an address in the upper-level air conditioning system allocated to each device in the lower-level air conditioning system with identification information on each device in the lower-level air conditioning system. A processor performs a mutual conversion on the communication
(Continued)

packets and the communication commands based on the association information stored in the association information memory.

3 Claims, 11 Drawing Sheets

(51) Int. Cl.
*H04L 12/28* (2006.01)
*H04L 29/06* (2006.01)
*H04L 12/66* (2006.01)
*H04L 29/08* (2006.01)

(58) Field of Classification Search
USPC ........................................................ 455/66.1
See application file for complete search history.

(56) References Cited

FOREIGN PATENT DOCUMENTS

| JP | 2005-143055 A | 6/2005 |
| JP | 2005-286872 A | 10/2005 |
| JP | 2006-129282 A | 5/2006 |
| JP | 4179297 B2 | 9/2008 |

OTHER PUBLICATIONS

Extended European Search Report dated Jan. 3, 2018 issued in corresponding EP patent application No. 14894519.9.

\* cited by examiner

| ADDRESS | DEVICE ID | DEVICE NAME | ... |
|---|---|---|---|
| 192.168.xxx.xx1 | ABC001 | OUTDOOR DEVICE | ... |
| 192.168.xxx.xx2 | ABC002 | INDOOR DEVICE A | ... |
| 192.168.xxx.xx3 | ABC003 | INDOOR DEVICE B | ... |
| 192.168.xxx.xx4 | ABC004 | INDOOR DEVICE C | ... |
| ⋮ | ⋮ | ⋮ | ⋮ |

| ADDRESS | SYSTEM | DEVICE ID | DEVICE NAME | ... |
|---|---|---|---|---|
| 192.168.xxx.xx1 | A | ABC001 | OUTDOOR DEVICE OF SYSTEM A | ... |
| 192.168.xxx.xx2 | A | ABC002 | INDOOR DEVICE A OF SYSTEM A | ... |
| 192.168.xxx.xx3 | A | ABC003 | INDOOR DEVICE B OF SYSTEM A | ... |
| 192.168.xxx.xx4 | A | ABC004 | INDOOR DEVICE C OF SYSTEM A | ... |
| 192.168.xxx.xx5 | B | BCD001 | OUTDOOR DEVICE OF SYSTEM B | ... |
| 192.168.xxx.xx6 | B | BCD002 | INDOOR DEVICE D OF SYSTEM B | ... |
| 192.168.xxx.xx7 | B | BCD003 | INDOOR DEVICE E OF SYSTEM B | ... |
| 192.168.xxx.xx8 | B | BCD004 | INDOOR DEVICE F OF SYSTEM B | ... |
| ⋮ | ⋮ | ⋮ | ⋮ | ⋮ |

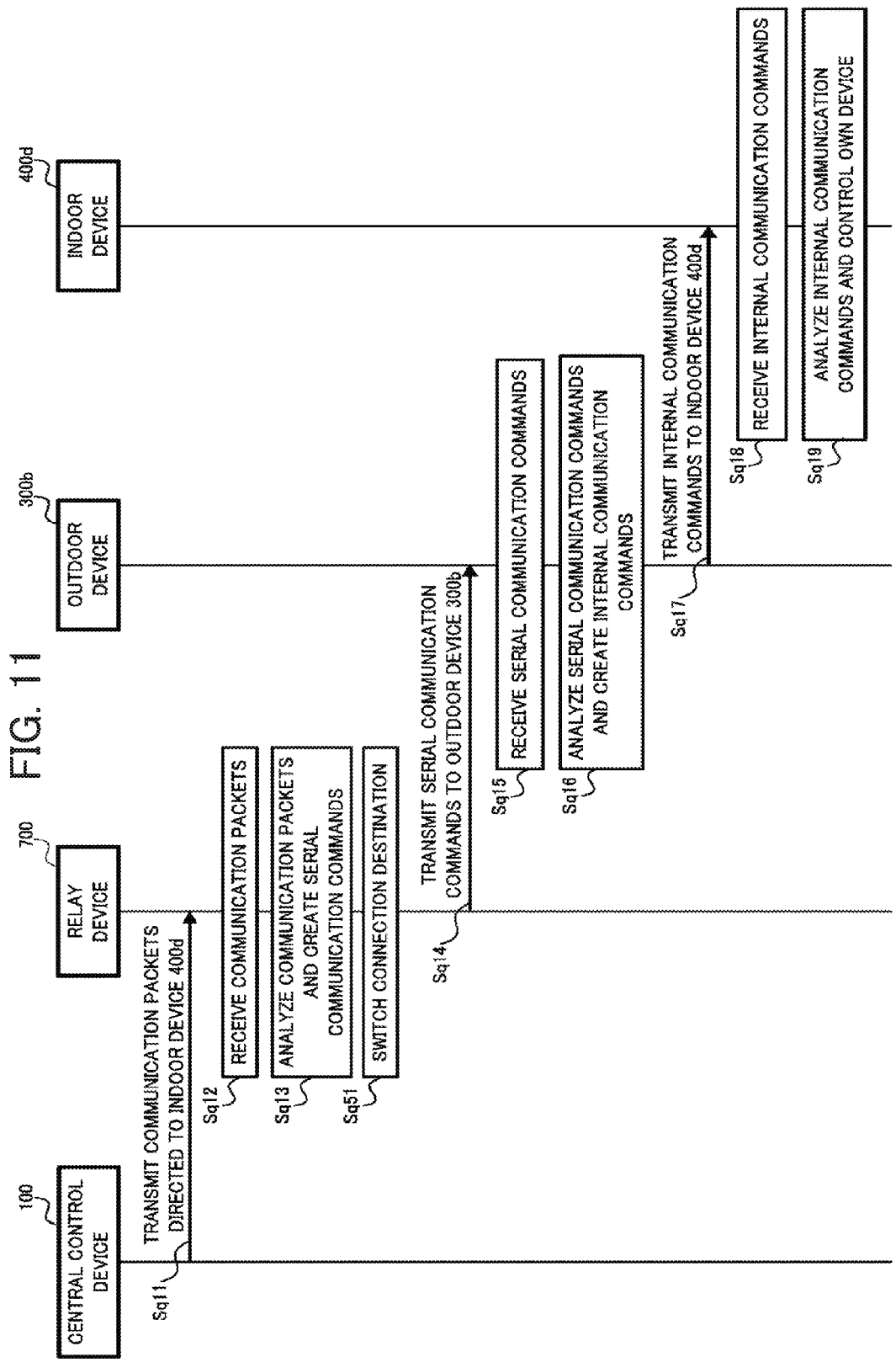

RELAY DEVICE AND AIR CONDITIONING SYSTEM

CROSS REFERENCE TO RELATED APPLICATION

This application is a U.S. national stage application of International Patent Application No. PCT/JP2014/065453 filed on Jun. 11, 2014, the disclosure of which is incorporated herein by reference.

TECHNICAL FIELD

The present disclosure relates to a relay device that relays systems constructed by different protocols, and an air conditioning system that includes multiple systems constructed by different protocols.

BACKGROUND ART

Conventionally, systems that manage (monitor, control) an air conditioner and a lighting device and the like are placed in a building or a house. Examples of such systems are (i) a large-scale air conditioning system (upper-level system) that includes a central control device, several outdoor devices, and several tens of indoor devices, and (ii) an intermediate and small scale air conditioning system (lower-level system) that includes an outdoor device and several indoor devices.

Such upper-level systems and lower-level systems often have differences not only in the scale but also in the protocol. Hence, it has been known a method of connecting both systems through a relay device provided with a protocol conversion function.

For example, Patent Literature 1 discloses an invention of connecting an air conditioner using a different protocol to a central management system including a central management device that manages multiple equipment instruments through a relay device (equipment instrument adaptor).

In addition, Patent Literature 2 discloses an invention of connecting a field bus (lower-level system in which outdoor devices and indoor devices are connected via local bus) using a different protocol to an upper-level bus (bus of upper-level system) of a network system through a relay device (converter).

CITATION LIST

Patent Literature

Patent Literature 1: Japanese Patent No. 4179297
Patent Literature 2: Unexamined Japanese Patent Application Kokai Publication No. 2004-301430

SUMMARY OF INVENTION

Technical Problem

According to the invention disclosed in Patent Literature 1, however, one relay device is necessary per connection of one air conditioner to the central management system. Hence, when a large number of air conditioners are connected to a large-scale central management system to realize the large-scale central management system, relay devices whose number is the same as the number of the air conditioners are necessary. This makes the system configuration complicated, and increases the system costs.

In addition, according to the invention disclosed in Patent Literature 2, the upper-level bus and the local bus are connected through the relay device. Hence, when, the lower-level system adopts a master-slave method of controlling, from the outdoor device that is a master device, the indoor device that is a slave device, a problem of an increase in the communication bandwidth of the local bus is caused. For example, when the indoor device in the lower-level system is controlled by the upper-level system, control commands are initially transmitted from the upper-level system to the indoor device in the lower-level system, but in the lower-level system, once the control commands are transferred to the outdoor device from the indoor device (from slave device to master device), and then control commands are eventually transmitted from the outdoor device to the indoor device (from master device to slave device) in the lower-level system. Eventually, the communication bandwidth of the local bus increases. In general, since the lower-level system is inexpensive in comparison with the upper-level system, when the communication bandwidth excessively increases, a reduction in service such as a communication difficulty may occur.

The present disclosure has been made to solve the aforementioned problems, and an objective of the present disclosure is to provide a relay device and an air conditioning system that are capable of performing appropriate communication between systems constructed with different protocols.

Solution to Problem

In order to achieve the above objective, a relay device according to the present disclosure is configured to connect an upper-level system and a lower-level system, and to relay communication between the upper-level system and the lower-level system, the upper-level system including a plurality of devices connected via a first bus and performing communication using an address allocated to each of the devices, the lower-level system including a plurality of devices connected via a second bus and performing communication in the master-slave method with any one of the devices being as a master device and other devices being as slave devices, and the relay device comprising:

an upper-side communicator configured to be connected to the first bus, and to transmit and receive communication packets to and from the upper-level system;

a lower-side communicator configured to be connected to the master device, and to transmit and receive communication commands to and from the lower-level system;

an association information memory configured to store association information obtained by associating the address in the upper-level system allocated to each of the plurality of devices in the lower-level system with identification information on each of the plurality of devices in the lower-level system; and a processor configured to perform a mutual conversion on the communication packets and the communication commands based on the association information stored in the association information memory.

Advantageous Effects of Invention

According to the relay device of the present disclosure, the upper-side communicator is connected to the first bus of the upper-level system, and the lower-side communicator is connected to the master device in the lower-level system. In addition, the processor performs a mutual conversion on the communication packets in the upper-level system and the communication commands in the lower-level system based on the association information stored in the association information memory. This enables appropriate communication between systems constructed by different protocols.

BRIEF DESCRIPTION OF DRAWINGS

FIG. 2 is a schematic diagram illustrating an example of association information stored in an association information memory in Embodiment 1;

FIG. 10 is a schematic diagram illustrating an example of association information stored in an association information memory in Embodiment 3; and FIG. 11 is a sequence diagram for explaining a data flow from a central control device to an indoor device in Embodiment 3.

DESCRIPTION OF EMBODIMENTS

Figure 1:
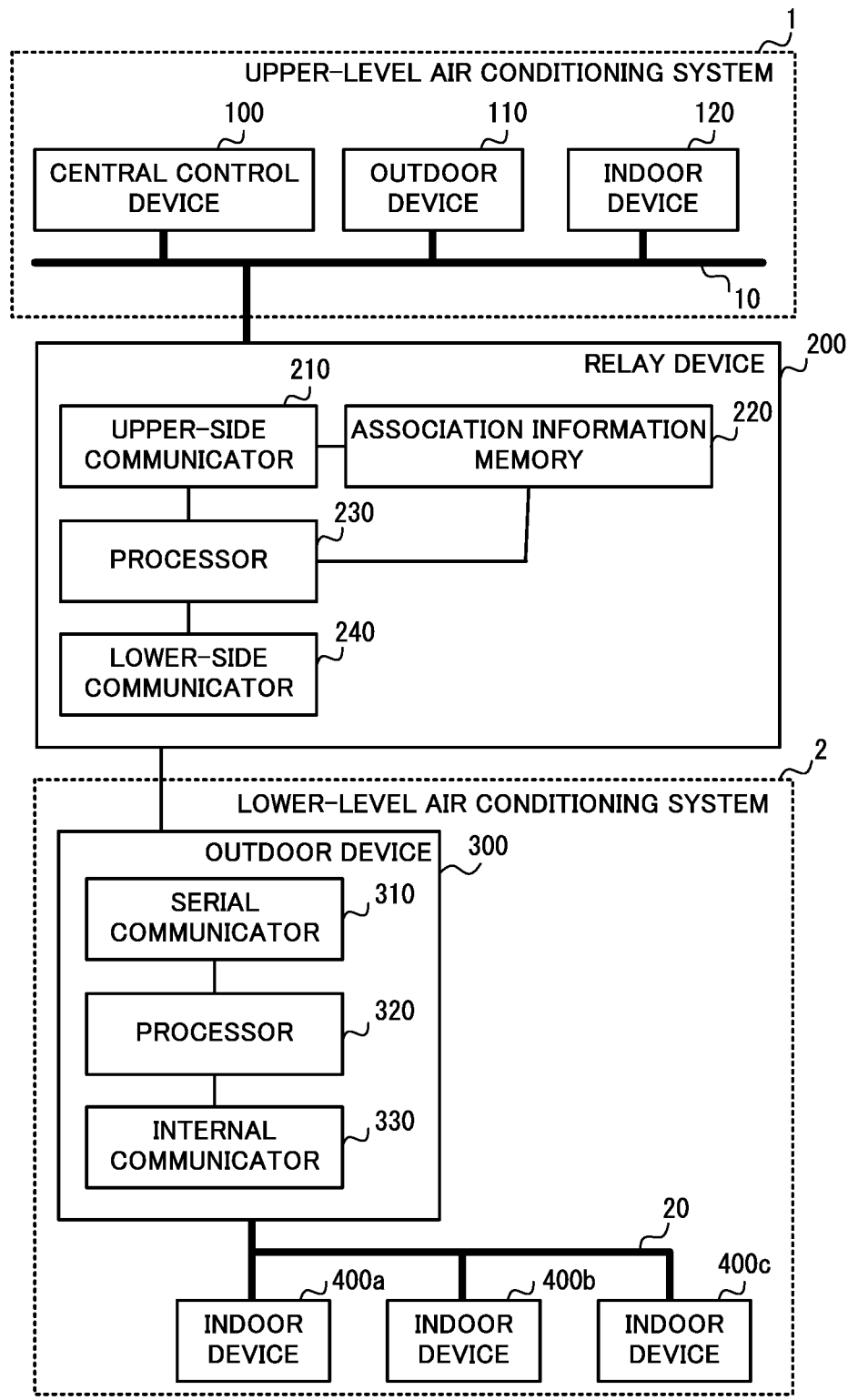
FIG. 1 is a block diagram illustrating an example of an entire configuration of an air conditioning system based on Embodiment 1 of the present disclosure.

Embodiments of the present disclosure will be explained below in detail with reference to the figures. Note that the same or equivalent portion throughout the figures will be denoted by the same reference numeral. The following explanation will be given for a specific example in which the present disclosure is applied to an air conditioning system, but as will be explained later, the present disclosure is also applicable to other systems. That is, the embodiments that will be explained below are for explanation only, and are not intended to limit the scope of the present disclosure. Hence, a person skilled in the art could carry out an embodiment in which each or all of elements are replaced with equivalents, and such embodiment should be within the scope of the present disclosure.

Embodiment 1

FIG. 1 is a block diagram illustrating an example of an entire configuration of an air conditioning system based on Embodiment 1 of the present disclosure. As illustrated in the figure, the air conditioning system has an upper-level air conditioning system 1 and a lower-level air conditioning system 2 that are connected with each other through a relay device 200. The upper-level air conditioning system 1 is constructed by, for example, a large-scale air conditioning system. On the other hand, the lower-level air conditioning system 2 is constructed by, for example, an intermediate and small scale air conditioning system.

The upper-level air conditioning system 1 and the lower-level air conditioning system 2 are constructed by different protocols. For example, in the upper-level air conditioning system 1, mutual communication is conducted based on communication packets flowing over a first bus 10 using the address set for each device as will be explained later. On the other hand, in the lower-level air conditioning system 2, communication is conducted in the master-slave method using the identification information (device ID) of each device as will be explained later. For example, in the lower-level air conditioning system 2, a control instruction and a data acquisition are performed between a master device and a slave device via a second bus 20 based on communication commands (more specifically, internal communication commands explained later).

(Configuration of Upper-Level Air Conditioning System 1 in Embodiment 1)

As illustrated in FIG. 1, the upper-level air conditioning system 1 has a central control device 100, an outdoor device 110, and an indoor device 120 that are connected via the first bus 10. In this FIG. 1, an example of simplified upper-level air conditioning system 1 is illustrated, but in practice, several tens of outdoor devices 110, and several tens of indoor devices 120 may be connected to the first bus 10. In addition, the first bus 10 is also connected to the relay device 200.

The central control device 100 performs a central control on the operation of the outdoor device 110 and that of the indoor device 120. In addition, the central control device 100 is also capable of controlling the operation of an outdoor device 300 in the lower-level air conditioning system 2 and that of an indoor device 400 (400a-400c) therein through the relay device 200.

The outdoor device 110 includes, for example, a compressor and a heat-source-end heat exchanger, and is connected to the indoor device 120 via piping. The outdoor device 110 circulates a cooling medium between the outdoor device 110 and the indoor device 120 via this piping. Note that the outdoor device 110 controls the outdoor device 110 in accordance with communication packets whose destination is the address of the outdoor device 110 transmitted over the first bus 10.

The indoor device 120 includes, for example, an expansion valve and a load-end heat exchanger, and is connected to the outdoor device 110 via piping. The indoor device 120 causes the load-end heat exchanger to evaporate or condense the cooling medium, thereby performing an air conditioning on a space subjected to air conditioning. Note that the indoor device 120 controls the indoor device 120 in accordance with communication packets whose destination is the address of the indoor device 120 transmitted over the first bus 10.

(Configuration of Relay Device 200 in Embodiment 1)

The relay device 200 includes an upper-side communicator 210, an association information memory 220, a processor 230, and a lower-side communicator 240.

The upper-side communicator 210 includes, for example, an interface that can be connected to the first bus 10, and performs communication with each device in the upper-level air conditioning system 1. The upper-side communicator 210 performs communication using information such as an address stored (registered) in the association information memory 220 as explained later. More specifically, when the destination of communication packets over the first bus 10 is the registered address (that is, address of any one of the devices in the lower-level air conditioning system 2) in the association information memory 220 the upper-side communicator 210 receives the communication packets, and supplies the received packets to the processor 230 (communication packet reception process). In addition, the upper-side communicator 210 transmits, over the first bus 10, serial communication packets (more specifically, communication packets converted by the processor 230 from serial communication commands transmitted from the lower-level air conditioning system 2) created by the processor 230 (communication packet transmission process).

The association information memory 220 includes, for example, a database and the like, and stores, for each device in the lower-level air conditioning system 2, association information indicating the association relationship between the address and the device ID. As an example, the association information memory 220 stores association information 221 illustrated in FIG. 2. This association information 221 defines, for the address allocated to each device in the lower-level air conditioning system 2, the device ID, the device name and the like, to identify each device. Note that the address is an available value over the first bus 10 of the upper-level air conditioning system 1. Further, the value not redundant with those of the outdoor device 110 and indoor device 120 explained above is allocated to the address.

Returning to FIG. 1, the processor 230 includes, for example, a Central Processing Unit (CPU), a Read Only Memory (ROM), and a Random Access Memory (RAM), reads a program stored in the ROM or the like to the RAM, and causes the CPU to execute the read program, thereby executing various processes. More specifically, the processor 230 analyzes (i) the communication packets received by the upper-side communicator 210 from the upper-level air conditioning system 1, and (ii) the serial communication commands received by the lower-side communicator 240 from the lower-level air conditioning system 2 (analysis process). In addition, the processor 230 refers to the association information 221 stored in the association information memory 220 to create communication packets (convert serial communication commands to communication packets), and instructs the upper-side communicator 210 to transmit the created packets (communication packet creation process). Still further, the processor 230 likewise refers to the association information 221 to create serial communication commands (convert communication packets to serial communication commands), and instructs the lower-side communicator 240 to transmit the created commands (serial communication command creation process).

The lower-side communicator 240 includes, for example, an interface (as an example, serial communication interface) that can be connected with the outdoor device 300 in the lower-level air conditioning system 2, and performs communication with the outdoor device 300 and the indoor device 400 (400a-400c) via the outdoor device 300. More specifically, the lower-side communicator 240 receives serial communication commands transmitted from the outdoor device 300, and supplies the received commands to the processor 230 (serial communication command reception process). In addition, the lower-side communicator 240 transmits serial communication commands created by the processor 230 to the outdoor device 300 (serial communication command transmission process).

(Configuration of Lower-Level Air Conditioning System 2 in Embodiment 1)

The lower-level air conditioning system 2 includes the outdoor device 300 and the indoor device 400 (400a-400c) that are connected with each other via the second bus 20. In addition, the outdoor device 300 is connected to the above mentioned relay device 200 (lower-side communicator 240) via, for example, a serial communication interface. Note that the configuration of each device in the lower-level air conditioning system 2 is merely an example, and the number of outdoor device 300 and that of indoor device 400 can be modified as appropriate. When there are multiple outdoor devices 300 in the lower-level air conditioning system 2, only one outdoor device 300 becomes a master device as explained later, and the other outdoor devices 300 become slave devices as explained later like the indoor device 400.

In the lower-level air conditioning system 2 illustrated in FIG. 1, the outdoor device 300 is a master device, and the indoor device 400 (400a-400c) is a slave device, thereby performing communication in the master-slave method. That is, the indoor device 400 that is the slave device determines the operation of the indoor device 400 in accordance with control commands (more specifically, internal communication commands) from the outdoor device 300 that is the master device. In addition, the outdoor device 300 controls the indoor device 400 and performs setting for the indoor device 400. Still further, the outdoor device 300 obtains response data and the like from the indoor device 400. The device ID is given to each device in the lower-level air conditioning system 2, and the device ID is used during the communication in the master-slave method. As an example, the device ID that is "ABC001" is given to the indoor device 400, and the device IDs that are "ABC002", "ABC003", and "ABC004" are respectively given to the indoor devices 400a, 400b, and 400c.

(Configuration of Outdoor Device 300 in Lower-Level Air Conditioning System 2 in Embodiment 1)

The outdoor device 300 includes a serial communicator 310, a processor 320, and an internal communicator 330. Note that the outdoor device 300 (i) includes, in addition to those components, for example, a compressor, a heat-source-end heat exchanger and the like, to achieve original functions of the device, and (ii) is connected to the indoor device 400 (400a-400c) via piping. The outdoor device 300 circulates the cooling medium between the outdoor device 300 and the indoor device 400 via the piping.

The serial communicator 310 includes, for example, an interface (as an example, serial communication interface) that can be connected to the above lower-side communicator 240, and performs communication with the relay device 200. More specifically, the serial communicator 310 receives serial communication commands transmitted from the relay device 200, and supplies the received commands to the processor 320 (serial communication command reception process). In addition, the serial communicator 310 transmits, to the relay device 200, the serial communication commands created by the processor 320 (serial communication command transmission process).

The processor 320 includes, for example, a CPU, a ROM and a RAM, reads the program stored in the ROM or the like to the RAM, and causes the CPU to execute the read program, thereby executing various processes. More specifically, the processor 320 analyzes (i) the serial communication commands received by the serial communicator 310 from the relay device 200, and (ii) the internal communication commands received by the internal communicator 330 from the indoor device 400 (400a-400c) (analysis process). In addition, the processor 320 creates serial communication commands, and instructs the serial communicator 310 to transmit the created commands (serial communication command creation process). Still further, the processor 320 creates internal communication commands, and instructs the internal communicator 330 to transmit the created commands (internal communication command creation process).

The internal communicator 330 includes, for example, an interface that can be connected to the second bus 20, and performs communication with the indoor device 400 (400a-400c) in the lower-level air conditioning system 2 in the master-slave method. More specifically, the internal communicator 330 receives the internal communication commands transmitted from the indoor device 400, and supplies the received commands to the processor 320 (internal communication command reception process). In addition, the internal communicator 330 transmits, the internal communication commands created by the processor 320, to the indoor device 400 (internal communication command transmission process).

(Indoor Device 400 of Lower-Level Air Conditioning System 2 in Embodiment 1)

The indoor device 400 (400a-400c) analyzes the internal communication commands transmitted from the outdoor device 300 and controls the indoor device 400 (control process). In addition, the indoor device 400 notifies the outdoor device 300 of response data, such as the status of the indoor device 400 and the setting thereof (response process). Still further, the indoor device 400 analyzes the internal communication commands transmitted from devices other than the outdoor device 300 (for example, remote controller) and changes the setting of the indoor device 400. At this time, the indoor device 400 changes the setting, but does not change the operation of the indoor device 400 until receiving, from the outdoor device 300, the internal communication commands containing the details of a control change. Note that the indoor device 400 (i) includes, in addition to those components, for example, an expansion valve and a load-end heat exchanger and the like, to achieve the original functions of the device, and (ii) is connected to the outdoor device 300 via the piping. The indoor device 400 causes the load-end heat exchanger to evaporate or condense the cooling medium, thereby performing an air conditioning on a space subjected to the air conditioning.

(Operation of Entire Air Conditioning System in Embodiment 1)

Figure 3:
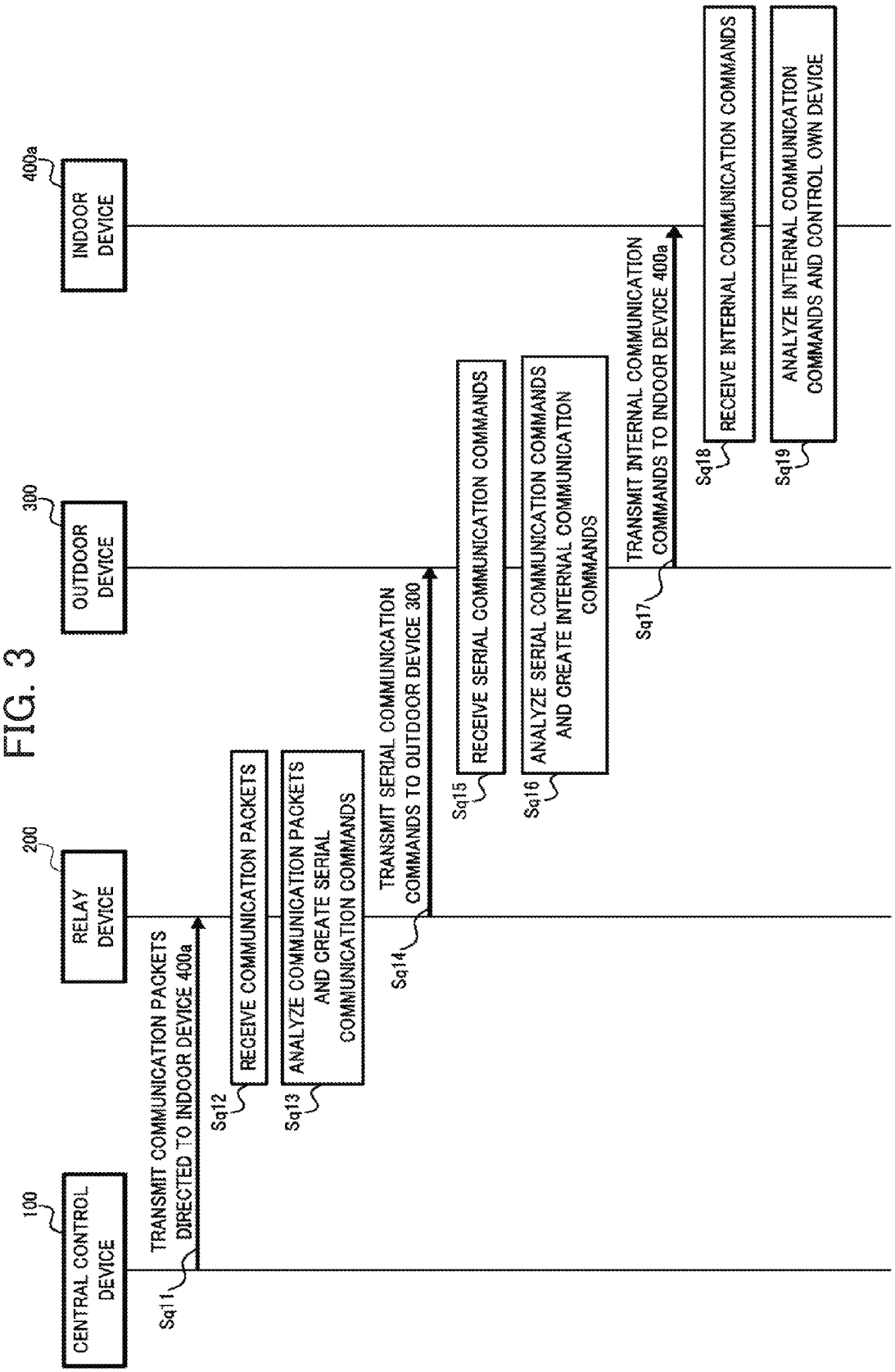
FIG. 3 is a sequence diagram for explaining a data flow from a central control device to an indoor device in Embodiment 1.
Figure 4:
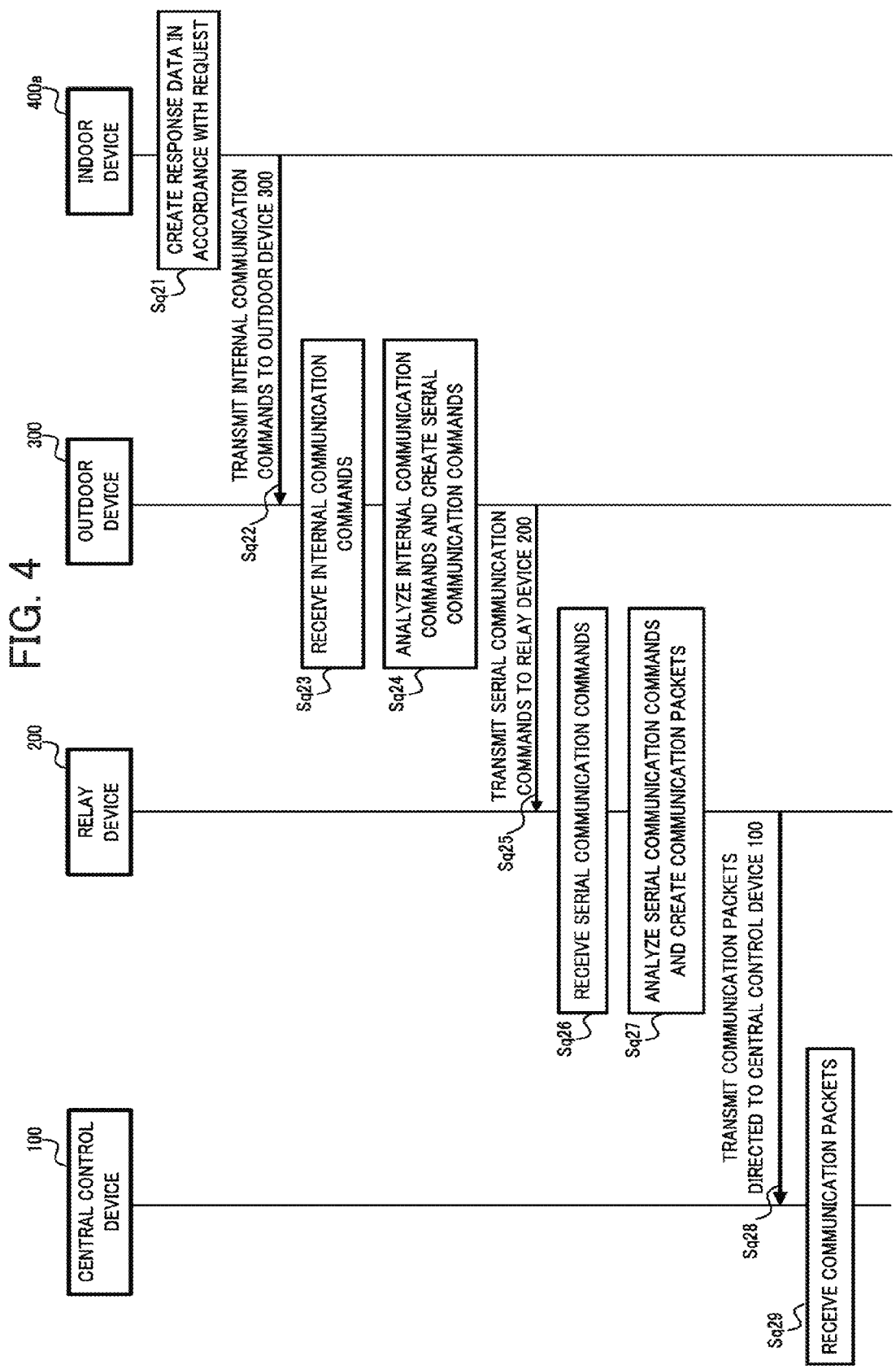
FIG. 4 is a sequence diagram for explaining a data flow from the indoor device to the central control device in Embodiment 1.

Operations of the entire air conditioning system will be explained below with reference to FIGS. 3 and 4. FIG. 3 is a sequence diagram illustrating a data flow when the indoor device 400a is controlled by the central control device 100. That is, in a sequence diagram of FIG. 3, a data flow from the upper-level air conditioning system 1 to the lower-level air conditioning system 2 through the relay device 200 will be explained. In addition, FIG. 4 is a sequence diagram illustrating a data flow when the indoor device 400a notifies the central control device 100 of response data. That is, in a sequence diagram of FIG. 4, a data flow from the lower-level air conditioning system 2 to the upper-level air conditioning system 1 through the relay device 200 will be explained.

First, with reference to FIG. 3, an explanation will be given for a data flow when the indoor device 400a is controlled by the central control device 100.

First, the central control device 100 transmits communication packets to a destination that is the indoor device 400a (sequence sq11). That is, the central control device 100 transmits, over the first bus 10, communication packets whose destination is an address "192.168.xxx.xx2". Note that the communication packets contain the address of the central control device 100, i.e., the transmitter.

Since communication packets transmitted over the first bus 10 are directed to the device in the lower-level air conditioning system 2, the upper-side communicator 210 of the relay device 200 receives the communication packets (sequence sq12). That is, when determining that the address "192.168.xxx.xx2" which is the destination of the communication packets matches one of the addresses contained in the association information 221 illustrated in FIG. 2 above, the upper-side communicator 210 executes the communication packet reception process to receive the communication packets, and supplies the received packets to the processor 230.

The processor 230 analyzes the communication packets received by the upper-side communicator 210, and creates serial communication commands (sequence sq13). That is, first, the processor 230 executes the analysis process to analyze the communication packets received by the upper-side communicator 210. Next, the processor 230 executes the serial communication command creation process and, with reference to the association information 221, converts the communication packets to serial communication commands. At this time, the processor 230 creates, in accordance with the association information 221 illustrated in FIG. 2, the serial communication commands whose destination is the device ID "ABC002" that corresponds to the address "192.168.xxx.xx2". Note that the transmission originator is unchanged which is the address of the central control device 100. Next, the processor 230 instructs the lower-side communicator 240 to transmit the created serial communication commands.

The lower-side communicator 240 transmits the serial communication commands created by the processor 230 to the outdoor device 300 (sequence sq14). That is, the lower-side communicator 240 executes the serial communication command transmission process to transmit, to the outdoor device 300, the serial communication commands whose destination is the device ID "ABC002".

The serial communicator 310 of the outdoor device 300 receives the serial communication commands transmitted from the relay device 200 (sequence sq15). That is, the serial communicator 310 executes the serial communication command reception process to receive the serial communication commands whose destination is the device ID "ABC002", and supplies the received commands to the processor 320.

The processor 320 analyzes the serial communication commands received by the serial communicator 310, and creates the internal communication commands (sequence sq16). That is, first, the processor 320 executes the analysis process to analyze the serial communication commands that are received by the serial communicator 310 from the relay device 200. Next, the processor 320 executes the internal communication command creation process to create the internal communication commands for controlling the indoor device 400a denoted with the device ID "ABC002", and instructs the internal communicator 330 to transmit the created commands.

The internal communicator 330 transmits the internal communication commands created by the processor 320 to the indoor device 400a (sequence sq17). That is, the internal communicator 330 transmits the internal communication commands toward the indoor device 400a that is the slave device.

The indoor device 400a receives the internal communication commands transmitted from the outdoor device 300 (sequence sq18).

The indoor device 400a analyzes the received internal communication commands, and controls the indoor device 400a (sequence sq19). That is, the indoor device 400a executes the control process to analyze the internal communication commands received from the outdoor device 300, and to control the indoor device 400a in accordance with the internal communication commands.

Next, with reference to FIG. 4, an explanation will be given for a data flow when the indoor device 400a notifies the central control device 100 of response data. Note that, as an example, the indoor device 400a notifies the central control device of the response data in response to request data from the central control device 100. However, the flow of the request data from the central control device 100 to the indoor device 400a is the same as the flow illustrated in FIG. 3. Hence, the explanation thereof will be omitted. The explanation will be given below first for the process of the indoor device 400a after the request data is received.

The indoor device 400a that has received the request data creates response data in accordance with such request (sequence sq21). That is, the indoor device 400a creates internal communication commands that contain response data. Note that the received request data contains, for example, the address of the central control device 100 as the address of the transmitter. Hence, the indoor device 400a creates the internal communication commands in which the address of the central control device 100 is set to be the destination and the device ID "ABC002" of the indoor device 400a is set to be the transmission originator.

The indoor device 400a transmits the created internal communication commands to the outdoor device 300 (sequence sq22).

The internal communicator 330 of the outdoor device 300 receives the internal communication commands transmitted from the indoor device 400a (sequence sq23). That is, the internal communicator 330 executes the internal communication command reception process to receive the internal communication commands transmitted from the indoor device 400a, and supplies the received commands to the processor 320.

The processor 320 analyzes the internal communication commands received by the internal communicator 330, and creates serial communication commands (sequence sq24). That is, first, the processor 320 executes the analysis process to analyze the internal communication commands that are received by the internal communicator 330 from the indoor device 400a. Next, the processor 320 executes the serial communication command creation process to create the serial communication commands, and instructs the serial communicator 310 to transmit the created commands.

The serial communicator 310 transmits the serial communication commands created by the processor 320 to the relay device 200 (sequence sq25). That is, the serial communicator 310 executes the serial communication command transmission process to transmit, to the relay device 200, the serial communication commands created by the processor 320.

The lower-side communicator 240 of the relay device 200 receives the serial communication commands transmitted from the outdoor device 300 (sequence sq26). That is, the lower-side communicator 240 executes the serial communication command reception process to receive the serial communication commands transmitted from the outdoor device 300, and supplies the received commands to the processor 230.

The processor 230 analyzes the serial communication commands received by the lower-side communicator 240, and creates communication packets (sequence sq27). That is, the processor 230 first executes the analysis process to analyze the serial communication commands received by the lower-side communicator 240. Next, the processor 230 executes the communication packet creation process, and converts the serial communication commands to the communication packets with reference to the association information 221. At this time, the processor 230 creates, in accordance with the association information 221 illustrated in FIG. 2, the communication packets in which as the transmission originator, the address "192.168.xxx.xx2" corresponding to the device ID "ABC002" is set. Note that the destination is unchanged which is the address of the central control device 100. Next, the processor 230 instructs the upper-side communicator 210 to transmit the created communication packets.

The upper-side communicator 210 transmits the communication packets directed to the central control device 100 (sequence sq28). That is, the upper-side communicator 210 executes the communication packet transmission process to transmit, over the first bus 10, the communication packets in which a destination is set to be the address of the central control device 100.

Since the communication packets transmitted over the first bus 10 are directed to the central control device 100, the central control device 100 receives the communication packets (sequence sq29). That is, the central control device 100 receives the communication packets that respond to the request, and obtains the response data from the indoor device 400a.

Advantageous Effects of Embodiment 1

As explained above, in accordance with the air conditioning system in Embodiment 1 of the present disclosure, the lower-level air conditioning system 2 that includes the outdoor device 300 and the multiple indoor devices 400 is connectable to the upper-level air conditioning system 1 by use of the single relay device 200. Hence, an air conditioning system, in which communication is possible between systems that are constructed by different protocols, can be realized at low costs.

In addition, the relay device 200 stores, in the association information memory 220, the association information 221 obtained by associating the address which can be used in the upper-level air conditioning system 1 (address allocated to each device in lower-level air conditioning system 2) with the device ID of each device in the lower-level air conditioning system 2. Hence, when the device in the lower-level air conditioning system 2 is controlled by the device in the upper-level air conditioning system 1, the relay device 200 converts the communication packets to the communication commands (more specifically, serial communication commands) by use of the association information 221, and transmits the commands to the lower-level air conditioning system 2. Hence, in the upper-level air conditioning system 1, a process of identifying whether the device to be controlled is the device in the upper-level air conditioning system 1 or the device in the lower-level air conditioning system 2 is unnecessary, and the device in the lower-level air conditioning system 2 can be controlled and monitored like the device in the upper-level air conditioning system 1.

In addition, in accordance with conventional configurations in which each device in the lower-level air conditioning system 2 is connected to the relay device 200, even if communication is performed between the devices in the lower-level air conditioning system 2, the communication is performed through the internal region of the upper-level air conditioning system 1. Accordingly, a problem of increase in the communication bandwidth of the upper-level air conditioning system 1 is caused. By employing the configuration of Embodiment 1, however, the communication between the devices in the lower-level air conditioning system 2 is performed within the lower-level air conditioning system 2. This leads to an advantageous effect that communication bandwidth of the upper-level air conditioning system 1 is not increased.

Still further, in Embodiment 1, the indoor device 400 (400a-400c) in the lower-level air conditioning system 2 does not require an interface with the relay device 200, and thus the configuration of the indoor device 400 of the lower-level air conditioning system 2 can be designed without a particular consideration of the connection with the upper-level air conditioning system 1.

Yet still further, in accordance with conventional configurations in which the relay device 200 directly transmits control commands to the device to be controlled in the lower-level air conditioning system 2, when the device in the lower-level air conditioning system 2 is controlled by the upper-level air conditioning system 1, there are disadvantages such as an increased response time. That is, although control commands are initially transmitted from the upper-level air conditioning system 1 to the indoor device 400 in the lower-level air conditioning system 2, in the lower-level air conditioning system 2, once the control commands are transferred (control details are notified) from the indoor device 400 to the outdoor device 300, and then the control commands are eventually transmitted to the indoor device 400 from the outdoor device 300. Consequently, the response time becomes long, and the communication bandwidth of the second bus 20 increases. According to Embodiment 1, however, an operation configuration is employed in which the outdoor device 300 receives, from the upper-level air conditioning system 1, the communication commands directed to the indoor device 400 in the lower-level air conditioning system 2 (more specifically, serial communication commands through relay device 200) and transmits the communication commands (more specifically, internal communication commands) to the indoor device 400. This leads to advantageous effects such as a reduced response time.

Moreover, in accordance with conventional configurations in which the relay device 200 directly transmits control commands to the indoor device 400 which is the device to be controlled in the lower-level air conditioning system 2, there is a case where both the upper-level air conditioning system 1 and the outdoor device 300 in the lower-level air conditioning system 2 individually control the indoor device 400 in the lower-level air conditioning system 2. Thus, an inconsistency in control of the indoor device 400 may occur. According to Embodiment 1, however, an operation configuration is employed in which the outdoor device 300 receives, from the upper-level air conditioning system 1, the communication commands directed to the indoor device 400 in the lower-level air conditioning system 2 and transmits the communication commands to the indoor device 400. This leads to advantageous effects that no inconsistency in control of the indoor device 400 is caused between the upper-level air conditioning system 1 and the outdoor device 300 in the lower-level air conditioning system 2.

As explained above, according to the air conditioning system in Embodiment 1 of the present disclosure, appropriate communication can be performed between systems constructed by different protocols without increasing system costs and without unnecessarily increasing the communication bandwidth of the lower-level air conditioning system 2.

Modified Example in Embodiment 1

The Embodiment 1 of the present disclosure has been explained above, but the specific configuration is not limited to Embodiment 1. Design changes, and the like, without departing from the scope of the present disclosure can be made.

According to Embodiment 1, when the data on the indoor device 400 in the lower-level air conditioning system 2 is obtained at the upper-level air conditioning system 1, the request data is transmitted to the indoor device 400 in the lower-level air conditioning system 2. When, however, the outdoor device 300 has data of the indoor device 400 (requested data), the outdoor device 300 may create response data and reply without transmitting the request data to the indoor device 400. By employing such an operation, advantageous effects of reducing the response time and the communication bandwidth of the second bus 20 is achieved.

In the above Embodiment 1, the explanation has been given for a case in which the relay device 200 and the outdoor device 300 in the lower-level air conditioning system 2 are connected via serial communication. However, the communication between the relay device 200 and the outdoor device 300 may be speeded up faster than, for example, the second bus 20 connecting the outdoor device 300 and the indoor device 400. According to this configuration, when the indoor device 400 in the lower-level air conditioning system 2 is controlled by the upper-level air conditioning system 1, an advantageous effect of reducing a control time (response time until control is reflected) is achieved.

In addition, in the above Embodiment 1, the explanation has been given for a case in which the communication between the relay device 200 and the outdoor device 300 in the lower-level air conditioning system 2, and the communication between the outdoor device 300 and the indoor device 400 are conducted through different communication interfaces. However, the communication between the relay device 200 and the outdoor device 300, and the communication between the outdoor device 300 and the indoor device 400 may share a common communication interface. More specifically, as illustrated in FIG. 5, the communication between a relay device 500 and the outdoor device 300 is also performed via the second bus 20.

Figure 5:
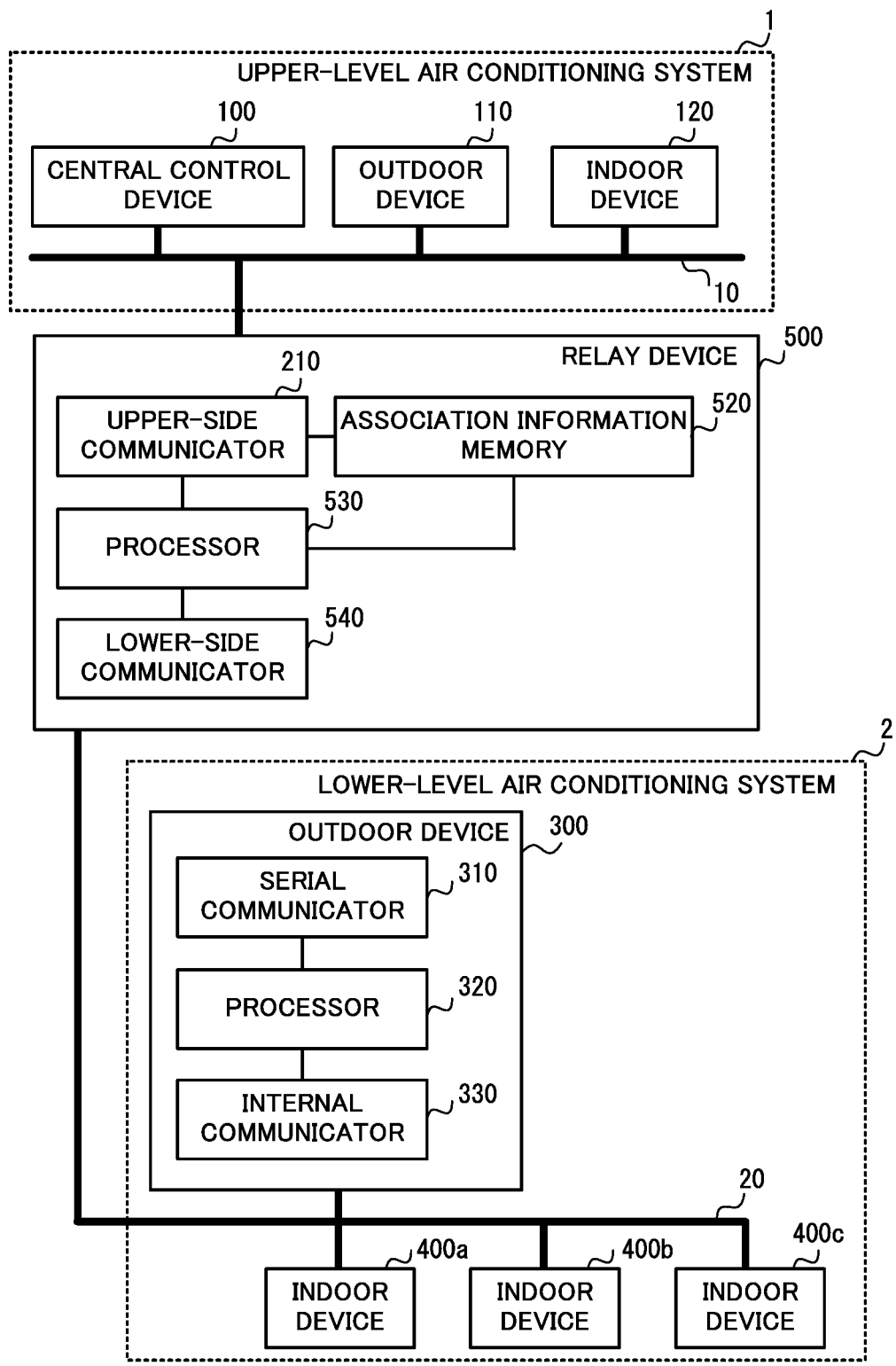
FIG. 5 is a block diagram illustrating an example of an entire configuration of an air conditioning system based on a modified example of Embodiment 1 of the present disclosure.

That is, the configuration of the relay device 500 in the air conditioning system illustrated in FIG. 5 is different from that of the relay device 200 illustrated in FIG. 1. In addition, the relay device 500 and the lower-level air conditioning system 2 are connected via the second bus 20. Note that in the following explanation, the common component and the like to that of Embodiment 1 will be denoted by the same reference numeral. That is, the configuration of the upper-level air conditioning system 1 and that of the lower-level air conditioning system 2 are the same as those in FIG. 1.

The relay device 500 includes the upper-side communicator 210, the association information memory 220, a processor 530, and an internal communicator 540. The configuration of the upper-side communicator 210 and that of the association information memory 220 are the same as those of the relay device 200 in FIG. 1.

The processor 530 analyzes (i) the communication packets that are received by the upper-side communicator 210 from the upper-level air conditioning system 1, and (ii) the internal communication commands that are received by the internal communicator 540 from the lower-level air conditioning system 2 (analysis process). In addition, the processor 530 refers to the association information 221 stored in the association information memory 220, creates communication packets (converts internal communication commands to communication packets), and instructs the upper-side communicator 210 to transmit the created packets (communication packet creation process). Still further, the processor 530 likewise refers to the association information 221, creates internal communication commands (converts communication packets to internal communication commands), and instructs the internal communicator 540 to transmit the created commands (internal communication command creation process).

The internal communicator 540 includes, for example, an interface connectable with the second bus 20, and performs communication with the outdoor device 300 and the indoor device 400 (400a-400c) via the outdoor device 300. More specifically, the internal communicator 540 receives the internal communication commands transmitted from the outdoor device 300, and supplies the received commands to the processor 530 (internal communication command reception process). In addition, the internal communicator 540 transmits the internal communication commands created by the processor 530 to the outdoor device 300 (internal communication command transmission process).

The relay device 500 employing such configuration executes, when receiving, from the upper-level air conditioning system 1, the communication commands directed to the indoor device 400 in the lower-level air conditioning system 2 (more specifically, converted internal communication commands), a process of transmitting the received communication commands to the outdoor device 300. This enables an accomplishment of the advantageous effect similar to that of Embodiment 1.

Embodiment 2

Figure 6:
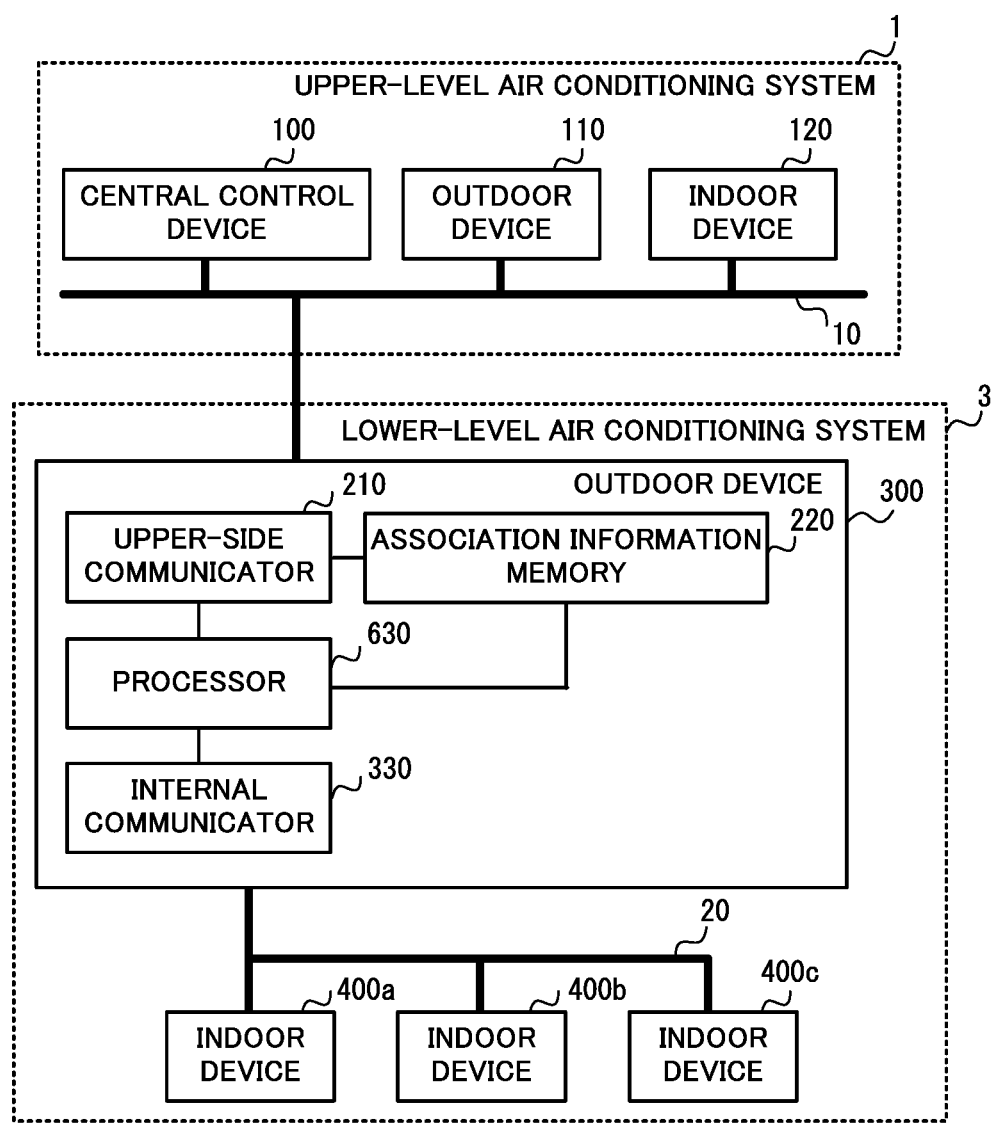
FIG. 6 is a block diagram illustrating an example of an entire configuration of an air conditioning system based on Embodiment 2 of the present disclosure.

The relay device 200 and the outdoor device 300 in the lower-level air conditioning system 2 according to the above Embodiment 1 employ the configurations illustrated in FIG. 1, but may alternatively employ configurations illustrated in FIG. 6. The air conditioning system of Embodiment 2 of the present disclosure, illustrated in FIG. 6, differs from the outdoor device 300 and the lower-level air conditioning system 2 of Embodiment 1 in that the above configuration of the relay device 200 is incorporated in an outdoor device 600 to omit the relay device 200. That is, in accordance with the air conditioning system in Embodiment 2, the upper-level air conditioning system 1 and the lower-level air conditioning system 3 are configured to be connected with each other. In the following explanation, the component and the like, common to that in Embodiment 1 will be denoted by the same reference numeral. That is, the upper-level air conditioning system 1 employs the same configuration as the configuration in FIG. 1.

(Configuration of Lower-Level Air Conditioning System 3 in Embodiment 2)

A lower-level air conditioning system 3 illustrated in FIG. 6 includes the outdoor device 600 and the indoor device 400 (400a-400c) that are connected with each other via the second bus 20. In addition, the outdoor device 600 is connected with the upper-level air conditioning system 1 via the first bus 10. In the lower-level air conditioning system 3 also, the outdoor device 600 that is the master device communicates with the indoor device 400 that is the slave device in the master-slave method.

(Configuration of Outdoor Device 600 in Lower-Level Air Conditioning System 3 in Embodiment 2)

The outdoor device 600 includes the upper-side communicator 210, the association information memory 220, a processor 630, and the internal communicator 330. Note that the outdoor device 600 (i) includes, in addition to those components, for example, a compressor and a heat-source-end heat exchanger and the like to achieve the original function of the device, and (ii) is connected to the indoor device 400 (400a-400c) via piping. The outdoor device 600 circulates the cooling medium between the outdoor device 600 and the indoor device 400 through this piping.

The configuration of the upper-side communicator 210 and that of the association information memory 220 are the same as those of the above mentioned relay device 200 illustrated in FIG. 1. In addition, the configuration of the internal communicator 330 is the same as that of the above mentioned outdoor device 300 in FIG. 1.

The processor 630 includes, for example, a CPU, a ROM and a RAM, reads a program stored in the ROM or the like to the RAM, and causes the CPU to execute the read program, thereby executing various processes. More specifically, the processor 630 analyzes (i) the communication packets that are received by the upper-side communicator 210 from the upper-level air conditioning system 1, and (ii) the internal communication commands that are received by the internal communicator 330 from the indoor device 400 (400a-400c) (analysis process). In addition, the processor 630 refers to the association information 221 stored in the association information memory 220, creates communication packets (converts internal communication commands to communication packets), and instructs the upper-side communicator 210 to transmit the created packets (communication packet creation process). Still further, the processor 630 likewise refers to the association information 221, creates internal communication commands (converts communication packets to internal communication commands), and instructs the internal communicator 330 to transmit the created commands (internal communication command creation process).

(Operations of Entire Air Conditioning System in Embodiment 2)

Figure 7:
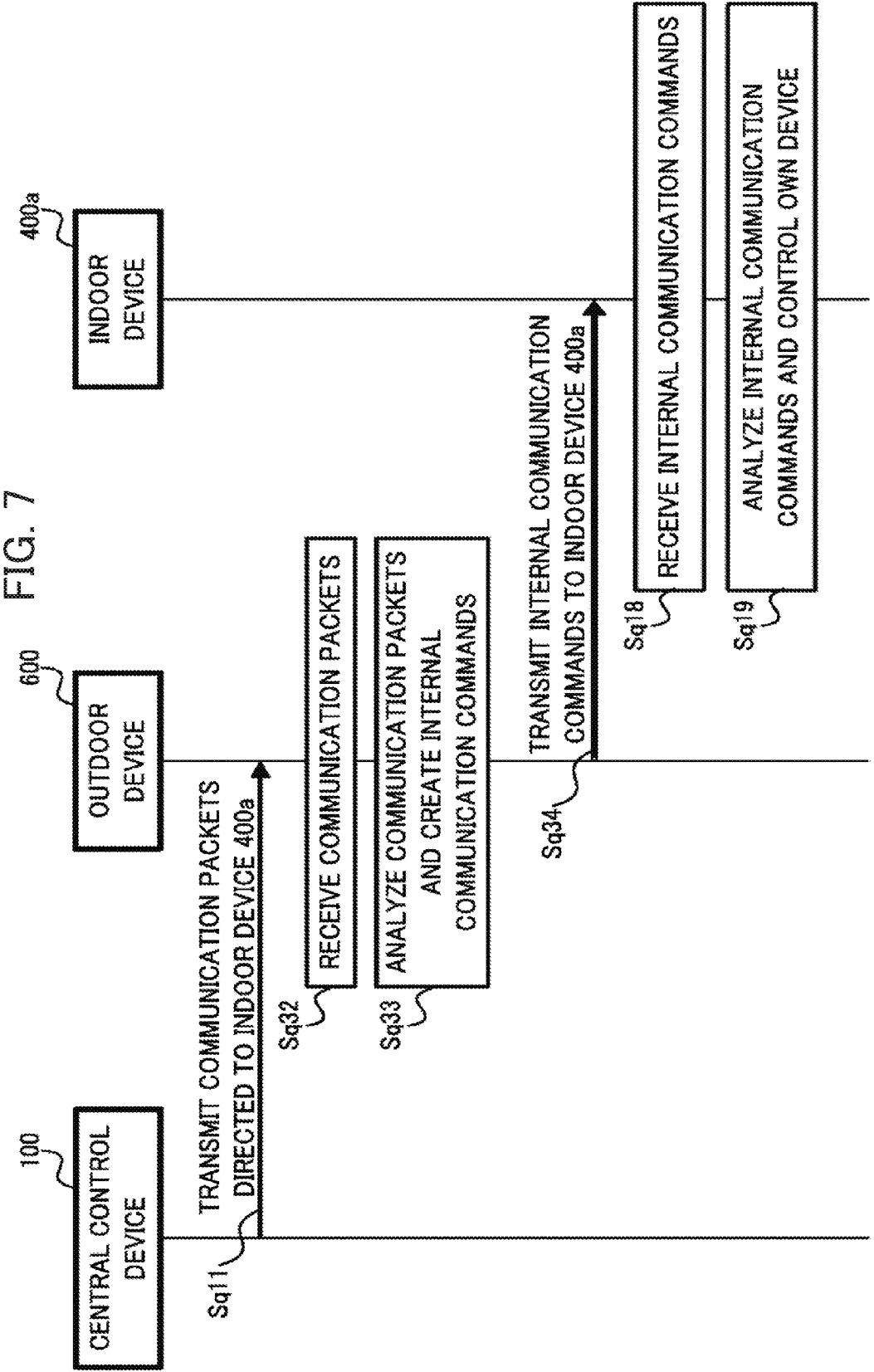
FIG. 7 is a sequence diagram for explaining a data flow from a central control device to an indoor device in Embodiment 2.
Figure 8:
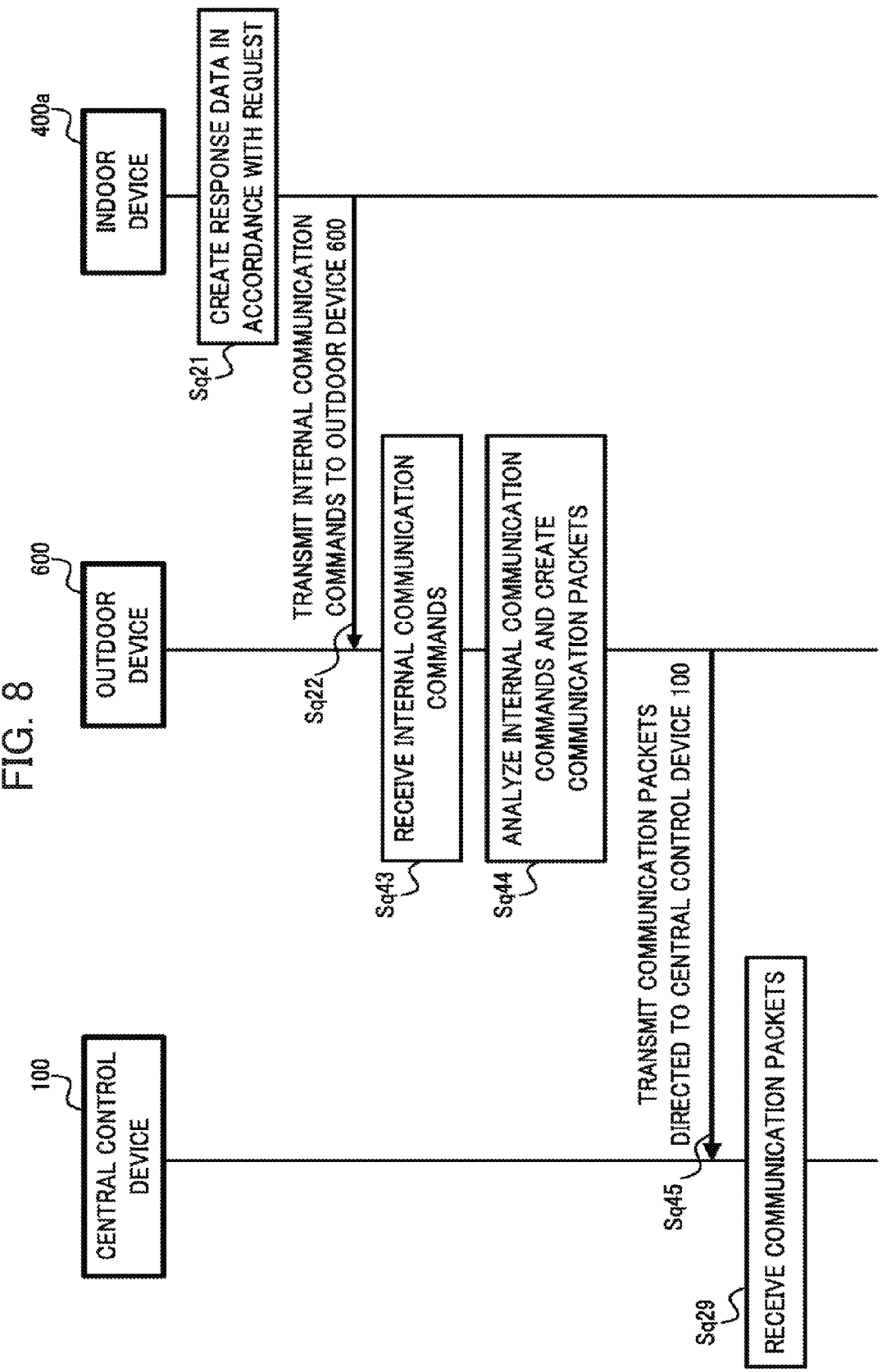
FIG. 8 is a sequence diagram for explaining a data flow from the indoor device to the central control device in Embodiment 2.

An explanation will be given below for operations of the entire air conditioning system with reference to FIGS. 7 and 8. FIG. 7 is a sequence diagram illustrating a data flow when the indoor device 400a is controlled by the central control device 100. That is, in the sequence diagram of FIG. 7, a data flow from the upper-level air conditioning system 1 to the lower-level air conditioning system 3 will be explained. In addition, FIG. 8 is a sequence diagram illustrating a data flow when the indoor device 400a notifies the central control device 100 of response data. That is, in the sequence diagram of FIG. 8, a data flow from the lower-level air conditioning system 3 to the upper-level air conditioning system 1 will be explained. Note that in the following explanation, the process details common to that of Embodiment 1 will be denoted by the same reference numeral.

First, with reference to FIG. 7, a data flow when the indoor device 400a is controlled by the central control device 100 will be explained.

First, the central control device 100 transmits communication packets directed to the indoor device 400a (sequence sq11). That is, the central control device 100 transmits, over the first bus 10, communication packets whose destination is the address of the indoor device 400a.

Since the communication packets transmitted over the first bus 10 are directed to the device (indoor device 400a) in the lower-level air conditioning system 3, the upper-side communicator 210 of the outdoor device 600 receives such communication packets (sequence sq32).

The processor 630 analyzes the communication packets received by the upper-side communicator 210, and creates the internal communication commands (sequence sq33). That is, the processor 630 first executes the analysis process to analyze the communication packets received by the upper-side communicator 210.

Next, the processor 630 executes the internal communication command creation process to convert the communication packets to the internal communication commands with reference to the association information 221.

The internal communicator 330 transmits the internal communication commands created by the processor 630 to the indoor device 400a (sequence sq34).

The indoor device 400a receives the internal communication commands transmitted from the outdoor device 600 (sequence sq18).

The indoor device 400a analyzes the received internal communication commands (sequence sq19), and controls the indoor device 400a. That is, the indoor device 400a executes the control process to analyze the internal communication commands received from the outdoor device 600, and to control the indoor device 400a in accordance with these internal communication commands.

Next, with reference to FIG. 8, an explanation will be given for a data flow when the indoor device 400a notifies the central control device 100 of response data. As an example, the indoor device 400a notifies the central control device 100 of the response data in response to the request data from the central control device 100. The flow of request data from the central control device 100 to the indoor device 400a is the same as that illustrated in FIG. 7. Hence, the explanation will be omitted. An explanation will be given below first for the process by the indoor device 400a after receiving the request data.

The indoor device 400a that has received the request data creates the response data in accordance with the request (sequence sq21). That is, the indoor device 400a creates the internal communication commands containing the response data.

The indoor device 400a transmits the created internal communication commands to the outdoor device 600 (sequence sq22).

The internal communicator 330 of the outdoor device 600 receives the internal communication commands transmitted from the indoor device 400a (sequence sq43).

The processor 630 analyzes the internal communication commands received by the internal communicator 330, and creates the communication packets (sequence sq44). That is, the processor 630 first executes the analysis process to analyze the internal communication commands received by the internal communicator 330. Next, the processor 630 executes the communication packet creation process to convert the internal communication commands to the communication packets with reference to the association information 221.

The upper-side communicator 210 transmits the communication packets directed to the central control device 100 (sequence sq45). That is, the upper-side communicator 210 executes the communication packet transmission process to transmit, over the first bus 10, the communication packets whose destination is the address of the central control device 100.

The central control device 100 receives the communication packets transmitted over the first bus 10 (sequence sq29) since such communication packets are directed to the central control device 100. That is, the central control device 100 receives the communication packets responding to the request, and obtains the response data from the indoor device 400a.

Advantageous Effects of Embodiment 2

As explained above, according to the air conditioning system in Embodiment 2 of the present disclosure, the lower-level air conditioning system 3 that includes the outdoor device 600 and the multiple indoor devices 400 is connectable to the upper-level air conditioning system 1 without using the relay device 200 and the like. Hence, an air conditioning system, in which communication is possible between systems constructed by different protocols, can be realized at low costs.

In addition, the outdoor device 600 stores, in the association information memory 220, the association information 221 obtained by associating an address that can be used in the upper-level air conditioning system 1 (address allocated to each device in lower-level air conditioning system 3) with the device ID of each device in the lower-level air conditioning system 3. Hence, when the device in the lower-level air conditioning system 3 is controlled by the device in the upper-level air conditioning system 1, the outdoor device 600 converts the communication packets to the communication commands (more specifically, internal communication commands) using this association information 221, and transmits the commands to the indoor device 400. Hence, in the upper-level air conditioning system 1, a process of identifying whether the device to be controlled is the device in the upper-level air conditioning system 1 or the device in the lower-level air conditioning system 3 is unnecessary, and like the device in the upper-level air conditioning system 1, the device in the lower-level air conditioning system 3 can be controlled and monitored.

Still further, in accordance with conventional configurations in which each device in the lower-level air conditioning system 3 is connected to the relay device 200, even if communication is performed between the devices in the lower-level air conditioning system 3, the communication is performed through the internal region of the upper-level air conditioning system 1. Thus, a problem of increase in the communication bandwidth of the upper-level air conditioning system 1 is caused. By employing the configuration of Embodiment 2, however, the communication between the devices in the lower-level air conditioning system 3 is performed within the lower-level air conditioning system 3. This leads to an advantageous effect that the communication bandwidth of the upper-level air conditioning system 1 is not increased.

Yet still further, in Embodiment 2, the indoor device 400 (400a-400c) in the lower-level air conditioning system 3 does not require an interface with the relay device 200 (relay device 200 itself is eliminated), and thus the configuration of the indoor device 400 in the lower-level air conditioning system 3 can be designed without a particular consideration of the connection with the upper-level air conditioning system 1.

Moreover, in accordance with conventional configurations in which the relay device 200 directly transmits control commands to the device to be controlled in the lower-level air conditioning system 3, when the device in the lower-level air conditioning system 3 is controlled by the upper-level air conditioning system 1, there are disadvantages such as an increased response time. That is, although control commands are initially transmitted from the upper-level air conditioning system 1 to the indoor device 400 in the lower-level air conditioning system 3, once the control commands are transferred (control details are notified) from the indoor device 400 to the outdoor device 600, and then the control commands are eventually transmitted to the indoor device 400 from the outdoor device 600 in the lower-level air conditioning system 3. Consequently, the response time becomes long, and the communication bandwidth of the second bus 20 increases. According to Embodiment 2, however, an operation configuration is employed in which the outdoor device 600 (i) receives, from the upper-level air conditioning system 1, the communication packets directed to the indoor device 400 in the lower-level air conditioning system 3 and (ii) transmits the communication commands (more specifically, internal communication commands) to the indoor device 400. Accordingly, there are advantageous effects such as a reduced response time.

In addition, in accordance with conventional configurations in which the relay device 200 directly transmits control commands to the indoor device 400 which is the device to be controlled in the lower-level air conditioning system 3, the upper-level air conditioning system 1 and the outdoor device 600 in the lower-level air conditioning system 3 individually control the indoor device 400 in the lower-level air conditioning system 3. Thus, this may probably cause an inconsistency in controlling the indoor device 400. According to Embodiment 2, however, an operation configuration is employed in which the outdoor device 600 (i) receives, from the upper-level air conditioning system 1, the communication packets directed to the indoor device 400 in the lower-level air conditioning system 3 and (ii) transmits the communication commands to the indoor device 400. This leads to advantageous effects that the upper-level air conditioning system 1 and the outdoor device 600 in the lower-level air conditioning system 3 do not cause inconsistency in controlling the indoor device 400.

As explained above, in accordance with the air conditioning system in Embodiment 2 of the present disclosure, appropriate communication can be carried out between systems constructed by different protocols without increasing system costs and without unnecessarily increasing the communication bandwidth of the lower-level air conditioning system 3.

Embodiment 3

Figure 9:
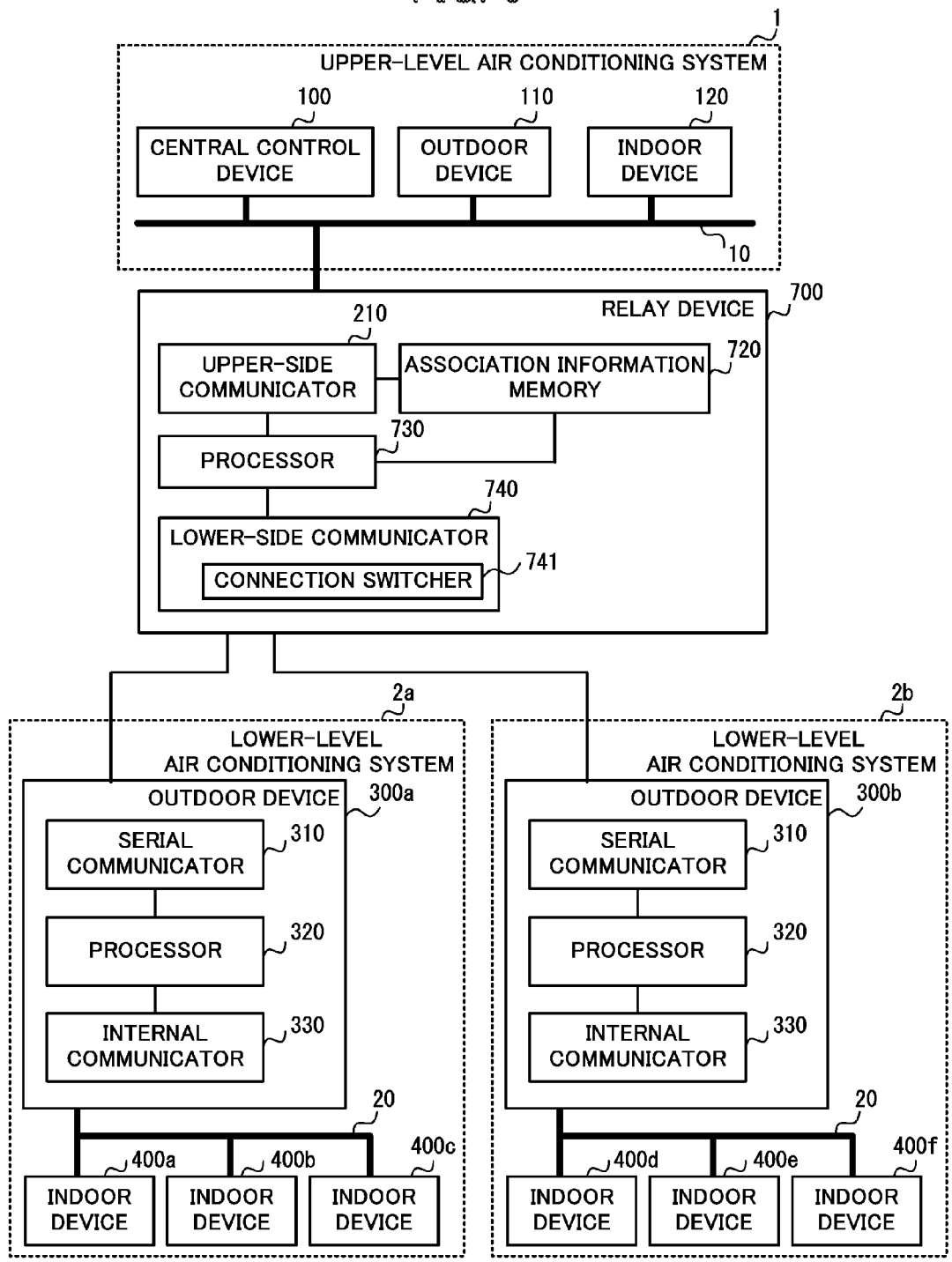
FIG. 9 is a block diagram illustrating an example of an entire configuration of an air conditioning system based on Embodiment 3 of the present disclosure.

The air conditioning system in the above Embodiment 1 employs the above mentioned configuration illustrated in FIG. 1, but may also employ the other configuration illustrated in FIG. 9. An air conditioning system in Embodiment 3 of the present disclosure illustrated in FIG. 9, differs from that in Embodiment 1 in that in Embodiment 3, the multiple lower-level air conditioning systems 2 (lower-level air conditioning systems 2a and 2b) that have different channel s are connected to the upper-level air conditioning system 1 through a relay device 700. That is, according to the air conditioning system in Embodiment 3, the relay device 700 switches the connection to each lower-level air conditioning system 2, and is communicable with the device in the lower-level air conditioning system 2. Note that in the following explanation, the component common to that of Embodiment 1 will be denoted by the same reference numeral. That is, the configuration of the upper-level air conditioning system 1 and that of each lower-level air conditioning system 2 are the same as those in FIG. 1. In addition, the explanation will be given by regarding that the lower-level air conditioning system 2a is "channel A", and the lower-level air conditioning system 2b is "channel B".

(Configuration of Relay Device 700 in Embodiment 3)

The relay device 700 includes the upper-side communicator 210, an association information memory 720, a processor 730, and a lower-side communicator 740. Note that the configuration of the upper-side communicator 210 is the same as that of the relay device 200 in FIG. 1.

The association information memory 720 includes, for example, a database and the like, and stores, for each device in the lower-level air conditioning system 2 of each channel, association information indicating the association relationship among the address, the channel, and the device ID. As an example, the association information memory 720 stores association information 721 illustrated in FIG. 10. This association information 721 defines, for the address allocated to each device in each lower-level air conditioning system 2, a value indicating the channel (value indicating "channel A" or "channel B"), the device ID, the device name and the like, for identifying each device. Note that the address is a value that can be used over the first bus 10 of the upper-level air conditioning system 1. The value not redundant with those of the outdoor device 110 and indoor device 120 are allocated to the address.

Returning to FIG. 9, the processor 730 includes, for example, a CPU, a ROM, a RAM and the like, reads the program stored in the ROM or the like to the RAM, and causes the CPU to execute the read program, thereby executing various processes. Specifically, the processor 730 analyzes (i) the communication packets that are received by the upper-side communicator 210 from the upper-level air conditioning system 1, and (ii) the serial communication commands that are received by the lower-side communicator 740 from any one of the lower-level air conditioning system 2 (analysis process). In addition, the processor 730 refers to the association information 721 stored in the association information memory 720, creates the communication packets (converts serial communication commands to communication packets), and instructs the upper-side communicator 210 to transmit the created packets (communication packet creation process). Still further, the processor 730 likewise refers to the association information 721, creates the serial communication commands (converts communication packets to serial communication commands), specifies the channel, and instructs the lower-side communicator 740 to transmit the created commands (serial communication command creation process). Note that, as will be explained later, when the lower-side communicator 740 (connection switcher 741) itself switches the connection destination, the specification of the channel may be omitted.

The lower-side communicator 740 includes, for example, the connection switcher 741, and an interface (as an example, serial communication interface) that can be connected to the outdoor device 300 in each lower-level air conditioning system 2 through the connection switcher 741.

The connection switcher 741 includes, for example, a connection changing switch having electric components such as transistors. The connection switcher 741 switches the connection destination to either an outdoor device 300a in the lower-level air conditioning system 2a or an outdoor device 300b in the lower-level air conditioning system 2b in accordance with the channel specified by the processor 730. For example, when the "channel A" is specified, the connection switcher 741 switches the connection destination to the outdoor device 300a, and alternatively when the "channel B" is specified, the connection switcher 741 switches the connection destination to the outdoor device 300b. The connection switcher 741 maintains the connection until (i) the serial communication commands are transmitted to the outdoor device 300, i.e., the connection destination and (ii) a response from the outdoor device 300 is obtained. Instead of switching the connection destination in accordance with the specification by the processor 730, the connection switcher 741 may itself analyze the serial communication commands (refer to the above mentioned association information 721 and the like), and switch the connection to the outdoor device 300 of the channel in accordance with the device ID of the destination.

The lower-side communicator 740 including the connection switcher 741 performs communication with the outdoor device 300 which is the connection destination in the lower-level air conditioning system 2, and the indoor device 400 through this outdoor device 300. More specifically, the lower-side communicator 740 receives the serial communication commands transmitted from the outdoor device 300 which is the connection destination, and supplies the received commands to the processor 730 (serial communication command reception process). In addition, the lower-side communicator 740 transmits the serial communication commands created by the processor 730 to the outdoor device 300 which is the connection destination (serial communication command transmission process).

(Operation of Entire Air Conditioning System in Embodiment 3)

An explanation will be given below for the operation of the entire air conditioning system with reference to FIG. 11. FIG. 11 is a sequence diagram illustrating a data flow when an indoor device 400d in the lower-level air conditioning system 2b is controlled by the central control device 100. That is, in the sequence diagram of FIG. 11, a data flow from the upper-level air conditioning system 1 to any one of the lower-level air conditioning system 2 (in this case, lower-level air conditioning system 2b) through the relay device 700 will be explained. Note that in the following explanation, the process detail common to that of Embodiment 1 will be denoted by the same reference numeral.

First, the central control device 100 transmits the communication packets directed to the indoor device 400d (sequence sq11). That is, the central control device 100 transmits, over the first bus 10, the communication packets whose destination is the address "192.168.xxx.xx6".

Since the communication packets transmitted over the first bus 10 are directed to the device in the lower-level air conditioning system 2 (more specifically, lower-level air conditioning system 2b), the upper-side communicator 210 in the relay device 700 receives such communication packets (sequence sq12). That is, the upper-side communicator 210 executes, when determining that the address "192.168.xxx.xx6" which is the destination of the communication packets matches one of the addresses stored in the association information 721 illustrated in FIG. 10 above, the communication packet reception process to receive the communication packets, and supplies the received packets to the processor 730.

The processor 730 analyzes the communication packets received by the upper-side communicator 210, and creates serial communication commands (sequence sq13). That is, first, the processor 730 executes the analysis process to analyze the communication packets received by the upper-side communicator 210. Next, the processor 730 executes the serial communication command creation process to convert the communication packets to serial communication commands with reference to the association information 721. At this time, the processor 730 creates, in accordance with the association information 721 illustrated in FIG. 10, the serial communication commands whose destination is the device ID "BCD002" corresponding to the address "192.168.xxx.xx6". Next, the processor 730 specifies the "channel B", and instructs the lower-side communicator 740 to transmit the created serial communication commands. Note that when the connection switcher 741 itself switches the connection destination, the specification of the channel may be omitted.

The lower-side communicator 740 switches the connection destination (sequence sq51). That is, the connection switcher 741 switches the connection destination to either the outdoor device 300a or the outdoor device 300b in accordance with the channel specified by the processor 730. In this case, since the "channel B" is specified, the connection switcher 741 switches the connection destination to the outdoor device 300b. Instead of switching the connection destination in accordance with the specification by the processor 730, the connection switcher 741 may itself analyze the serial communication commands (for example, with reference to the above association information 721), and switch the connection to the outdoor device 300b of the "channel B" in accordance with the device ID "BCD002" which is a destination.

The lower-side communicator 740 transmits the serial communication commands created by the processor 730 to the outdoor device 300b (sequence sq14). That is, the lower-side communicator 740 executes the serial communication command transmission process to transmit, to the outdoor device 300b which is the connection destination, the serial communication commands whose destination is the device ID "BCD002".

The serial communicator 310 of the outdoor device 300b receives the serial communication commands transmitted from the relay device 700 (sequence sq15). That is, the serial communicator 310 executes the serial communication command reception process to receive the serial communication commands whose destination is the device ID "BCD002", and supplies the received commands to the processor 320.

The processor 320 analyzes the serial communication commands received by the serial communicator 310, and creates the internal communication commands (sequence sq16). That is, first, the processor 320 executes the analysis process to analyze the serial communication commands that are received by the serial communicator 310 from the relay device 700. Next, the processor 320 executes the internal communication command creation process to create the internal communication commands for controlling the indoor device 400d whose device ID is "BCD002", and instructs the internal communicator 330 to transmit the created commands.

The internal communicator 330 transmits the internal communication commands created by the processor 320 to the indoor device 400d (sequence sq17). That is, the internal communicator 330 transmits the internal communication commands to the indoor device 400d that is the slave device.

The indoor device 400d receives the internal communication commands transmitted from the outdoor device 300b (sequence sq18).

The indoor device 400*d* analyzes the received internal communication commands, and controls the indoor device 400*d* (sequence sq19). That is, the indoor device 400*d* executes the control process to analyze the internal communication commands received from the outdoor device 300*b*, and to control the indoor device 400*d* in accordance with the internal communication commands.

In addition, the data flow when the indoor device 400*d* in the lower-level air conditioning system 2*b* notifies the central control device 100 of response data is the same as that illustrated in FIG. 4 since the connection switcher 741 maintains the connection.

Advantageous Effects of Embodiment 3

As explained above, according to the air conditioning system in Embodiment 3 of the present disclosure, the lower-level air conditioning systems 2 (lower-level air conditioning system 2 including the outdoor device 300 and the multiple indoor devices 400) that have a plurality of channels are connectable to the upper-level air conditioning system 1 through the single relay device 700. Hence, an air conditioning system, in which communication is possible between systems constructed by different protocols, can be realized at low costs.

In addition, the relay device 700 stores, in the association information memory 720, the association information 721 obtained by associating the address usable in the upper-level air conditioning system 1 (address allocated to each device in each lower-level air conditioning system 2) with the device ID of each device in each lower-level air conditioning system 2. Hence, when the device in any one of the lower-level air conditioning systems 2 is controlled by the device in the upper-level air conditioning system 1, the relay device 700 converts the communication packets to the communication commands (more specifically, serial communication commands) using this association information 721, and transmits the commands to the target lower-level air conditioning system 2. Hence, in the upper-level air conditioning system 1, a process of identifying whether the device to be controlled is the device in the upper-level air conditioning system 1 or the device in the lower-level air conditioning system 2 of any channel is unnecessary, and the device in each lower-level air conditioning system 2 can be controlled and monitored like the device in the upper-level air conditioning system 1.

In addition, in accordance with conventional configurations in which each device in the lower-level air conditioning system 2 is connected to the relay device 700, even if communication is performed between the devices in the lower-level air conditioning system 2, the communication is performed through the internal region of the upper-level air conditioning system 1. Thus, a problem of increase in the communication bandwidth of the upper-level air conditioning system 1 is caused. By employing the configuration of Embodiment 3, however, the communication between the devices of the lower-level air conditioning system 2 in the same channel is performed within each lower-level air conditioning system 2. This leads to an advantageous effect that the communication bandwidth of the upper-level air conditioning system 1 does not increase.

Still further, in Embodiment 3, the indoor device 400 (400*a*-400*c*) in each lower-level air conditioning system 2 does not require an interface with the relay device 700. Thus, the configuration of the indoor device 400 in each lower-level air conditioning system 2 can be designed without a particular consideration of the connection with the upper-level air conditioning system 1.

Yet still further, in accordance with conventional configurations in which the relay device 700 directly transmits control commands to the device to be controlled in the lower-level air conditioning system 2, when the device in the lower-level air conditioning system 2 is controlled by the upper-level air conditioning system 1, there are disadvantages such as the increased response time. That is, although control commands are initially transmitted from the upper-level air conditioning system 1 to the indoor device 400 in the target lower-level air conditioning system 2, in the lower-level air conditioning system 2, once the control commands are transferred (control details are notified) from the indoor device 400 to the outdoor device 300, and then the control commands are eventually transmitted to the indoor device 400 from the outdoor device 300. This causes the increased response time and the increased communication bandwidth of the second bus 20. According to Embodiment 3, however, an operation configuration is employed in which the outdoor device 300 receives, from the upper-level air conditioning system 1, the communication commands (more specifically, serial communication commands through relay device 700) directed to the indoor device 400 which is a device to be controlled in the lower-level air conditioning system 2 and transmits the communication commands (more specifically, internal communication commands) to the indoor device 400. This leads to advantageous effects such as a reduced response time.

Moreover, in accordance with conventional configurations in which the relay device 700 directly transmits control commands to the indoor device 400 that is a device to be controlled in the lower-level air conditioning system 2, there is a case where the upper-level air conditioning system 1 and the outdoor device 300 in the lower-level air conditioning system 2 individually control the indoor device 400 in the lower-level air conditioning system 2. This causes the possibility that an inconsistency in controlling the indoor device 400 occurs. According to Embodiment 3, however, an operation configuration is employed in which the outdoor device 300 receives, from the upper-level air conditioning system 1, the communication commands directed to the indoor device 400 which is the connection destination in the lower-level air conditioning system 2 and transmits the communication commands to the indoor device 400. This leads to advantageous effects that the upper-level air conditioning system 1 and the outdoor device 300 which is the connection destination in the lower-level air conditioning system 2 do not cause inconsistency in controlling the indoor device 400.

As explained above, according to the air conditioning system in Embodiment 3 of the present disclosure, appropriate communication can be carried out between systems constructed by different protocols without increasing system costs and without unnecessarily increasing the communication bandwidth of the lower-level air conditioning system 2.

Modified Example in Embodiment 3

Although Embodiment 3 of the present disclosure has been explained, the specific configuration is not limited to Embodiment 3, and design changes without departing from the scope of the present disclosure can be made.

In Embodiment 3, when data on the indoor device 400 which is the control destination in the lower-level air conditioning system 2 is to be obtained by the upper-level air conditioning system 1, the request data is transmitted to the indoor device 400 in the lower-level air conditioning system 2. However, in the same channel, when the outdoor device 300 holds data (requested data) of the indoor device 400, the outdoor device 300 may create the response data and reply without transmitting the request data to the indoor device 400. By employing such operations, there are advantageous effects such as the reduced response time and the reduced communication bandwidth of the second bus 20.

In Embodiment 3, the explanation has been given for a case in which the relay device 700 and the outdoor device 300 in each lower-level air conditioning system 2 are connected via serial communication. However, the communication between the relay device 700 and the outdoor device 300 may be speeded up faster than, for example, the second bus 20 connecting the outdoor device 300 to the indoor device 400. By employing this configuration, when the indoor device 400 in any one of lower-level air conditioning systems 2 is controlled by the upper-level air conditioning system 1, there is an advantageous effect that a control time (response time until control is reflected) is further reduced.

In Embodiment 3 above, the explanations have been given for a case where the lower-side communicator 740 (connection switcher 741) of the relay device 700 electrically switches the communication line using the connection changing switch that includes electric components such as transistors in order to have connection with the outdoor device 300 in the multiple lower-level air conditioning systems 2 that have different channels. However, the connection between the relay device 700 and each lower-level air conditioning system 2 may be accomplished by other schemes. For example, communication between the relay device 700 and each lower-level air conditioning system 2 (outdoor device 300) is performed via the second bus 20. That is, the second buses 20 in each of the lower-level air conditioning systems 2 are connected, and further the second bus 20 is connected to the relay device 700. At this time, like the relay device 500 illustrated in FIG. 5 above, the relay device 700 includes, instead of the lower-side communicator 740, the internal communicator 540. Next, the relay device 700 (internal communicator 540) transmits the internal communication commands over the second bus 20. Since the internal communication commands contain the device ID of the destination device, the corresponding device receives and processes the internal communication commands. Note that the internal communication commands may further contain information indicating the channel. In this case, in the corresponding channel, the device corresponding to the device ID receives and processes the internal communication commands. Those operations make unnecessary, for the relay device 700, to switch the connection destination depending on the destination of the created internal communication commands. Accordingly, the process load of the relay device 700 can be reduced.

In Embodiment 3 above, the explanation has been given for a case in which every time communication is necessary, the lower-side communicator 740 (connection switcher 741) of the relay device 700 switches the connection destination. However, communication may be performed while the lower-side communicator 740 of the relay device 700 sequentially switching the connection to the outdoor device 300 in each lower-level air conditioning system 2 at each predetermined time. For example, the relay device 700 transmits the serial communication commands to the outdoor device 300 in each lower-level air conditioning system 2 at a constant cycle.

In this case, when the lower-side communicator 740 (connection switcher 741) of the relay device 700 employs a configuration in which the communication line is electrically switched using the connection changing switch that includes electric components such as transistors, it becomes unnecessary to switch the connection changing switch depending on the destination of the serial communication commands to be transmitted. Hence, an overhead time at which the relay device 700 transmits the serial communication commands (time necessary for switching the connection changing switch) can be reduced, and the communication efficiency in serial communication can be improved.

Even if communication between the relay device 700 and each lower-level air conditioning system 2 (outdoor device 300) is performed via the second bus 20, the relay device 700 may transmit the internal communication commands to the outdoor device 300 in each lower-level air conditioning system 2 at constant cycle. For example, the timings of the relay device 700 and the outdoor device 300 of each lower-level air conditioning system 2 are synchronized, and the outdoor device 300a and the outdoor device 300b individually receive the internal communication commands transmitted from the relay device 700 within the timings set for each outdoor device. Hence, for the internal communication commands transmitted from the relay device 700, information for identifying to which lower-level air conditioning systems 2 of which channel, the destination device belongs becomes unnecessary. Accordingly, the communication efficiency in internal communication can be improved.

Other Embodiments

In the above embodiments, the upper-level air conditioning system 1 has been explained as an example of an upper-level system, and the lower-level air conditioning systems 2 and 3 have been explained as examples of a lower-level system. However, the present disclosure is likewise applicable to other systems. For example, the present disclosure is applicable, as appropriate, to a lighting system that has an upper-level lighting system as an upper-level system and a lower-level lighting system as a lower-level system connected with each other through a relay device and the like.

In the above embodiments, the explanation has been given for a case in which a dedicated relay device 200 and the like, is used. However, if a program that defines the operations of such dedicated relay device 200 is applied to a conventional personal computer and an information terminal device and the like, such a personal computer and the like can function as the relay device 200 and the like of the present disclosure.

In addition, how to distribute such a program is optional, and for example, the program may be stored in a non-transitory computer-readable recording medium, such as a Compact Disc Read-Only Memory (CD-ROM), a Digital Versatile Disc (DVD), a Magneto Optical disc (MO), or a memory card for the distribution, or may be distributed via a communication network such as Internet.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure is suitably applicable to a relay device that relays systems constructed by different protocols, and an air conditioning system including multiple systems constructed by different protocols.

REFERENCE SIGNS LIST

1 Upper-level air conditioning system
2, 3 Lower-level air conditioning system
10 First bus
20 Second bus
100 Central control device
200, 500, 700 Relay device
110, 300, 600 Outdoor device
120, 400 Indoor device
210 Upper-side communicator
220, 720 Association information memory
230, 320, 530, 630, 730 Processor
240, 740 Lower-side communicator
310 Serial communicator
330, 540 Internal communicator
741 Connection switcher

The invention claimed is:

1. A relay device for connecting an upper-level system and a lower-level system, and for relaying communication between the upper-level system and the lower-level system, the upper-level system including a plurality of devices connected via a first bus and performing communication using an address allocated to each of the plurality of devices, the lower-level system including a plurality of devices connected via a second bus and performing communication in a master-slave method with any one of the plurality of devices being as a master device and other devices being as slave devices, the relay device comprising:
   an upper-side communicator configured to be connected to the first bus, and to transmit and receive communication packets to and from the upper-level system;
   a lower-side communicator configured to be connected to the master device, and to transmit and receive communication commands to and from the lower-level system;
   an association information memory configured to store association information obtained by associating the address in the upper-level system allocated to each of the plurality of devices in the lower-level system with identification information on each of the plurality of devices in the lower-level system; and
   a processor configured to perform a mutual conversion on the communication packets and the communication commands based on the association information stored in the association information memory.

2. The relay device according to claim 1, wherein
   a plurality of the lower-level systems that have different channels is connectable with the relay device; and
   the lower-side communicator is configured to, when communication is performed between the upper-level system and any one of the lower-level systems, switch connection to a corresponding master device for communication in accordance with the lower-level system to be communicated.

3. The relay device according to claim 1, wherein
   a plurality of the lower-level systems that have different channels is connectable with the relay device; and
   the lower-side communicator is configured to sequentially switch connection to each master device for communication in accordance with the lower-level system at each predetermined time.

* * * * *